(12) United States Patent
Wang et al.

(10) Patent No.: US 11,633,755 B2
(45) Date of Patent: Apr. 25, 2023

(54) COMPLEX FLOW TUBE FOR FINE SEALING COATING OF PVC MATERIAL FOR AUTOMOBILE AND MANUFACTURING METHOD THEREFOR

(71) Applicants: South China University of Technology, Guangzhou (CN); Guangzhou Leijia Technology Co., Ltd., Guangzhou (CN)

(72) Inventors: Di Wang, Guangzhou (CN); Yimeng Wang, Guangzhou (CN); Yongqiang Yang, Guangzhou (CN); Zhenlong Xu, Guangzhou (CN)

(73) Assignee: Guangzhou Laseradd Technology Co,. LTD, Guangzhou (CN)

( * ) Notice: Subject to any disclaimer, the term of this patent is extended or adjusted under 35 U.S.C. 154(b) by 665 days.

(21) Appl. No.: 16/605,030

(22) PCT Filed: Nov. 28, 2017

(86) PCT No.: PCT/CN2017/113371
§ 371 (c)(1),
(2) Date: Oct. 14, 2019

(87) PCT Pub. No.: WO2018/188349
PCT Pub. Date: Oct. 18, 2018

(65) Prior Publication Data
US 2021/0187541 A1    Jun. 24, 2021

(30) Foreign Application Priority Data
Apr. 14, 2017    (CN) .......................... 201710245318.X (51) Int. Cl.
*B05C 5/02* (2006.01)
*B22F 10/28* (2021.01)
(Continued)

(52) U.S. Cl.
CPC ................ *B05C 5/02* (2013.01); *B22F 10/28* (2021.01); *B22F 10/36* (2021.01); *B22F 10/366* (2021.01);
(Continued)

(58) Field of Classification Search
None
See application file for complete search history.

(56) References Cited

U.S. PATENT DOCUMENTS 1,258,322 A * 3/1918 Doellinger ................ A23G 3/28
118/313
2,081,908 A * 6/1937 Black ........................ B67B 5/05
118/305

(Continued)

FOREIGN PATENT DOCUMENTS

CN    1603031 A    4/2005
CN    201216981 Y    4/2009
(Continued)

*Primary Examiner* — Jethro M. Pence
(74) *Attorney, Agent, or Firm* — The Webb Law Firm (57) ABSTRACT

A complex flow tube for fine sealing coating of a PVC material for an automobile includes a base fixed to a mechanical arm, and a pipeline connected to the base for delivering a PVC sealant; the base is detachably butted with an interface of a PVC gluing pump mounted on the mechanical arm; the PVC gluing pump delivers the PVC sealant through the pipeline to a part to be coated or sealed of the automobile. The complex flow tube may be combined with the metal 3D printing technology, so that the manufactured complex flow tube has the advantages of being convenient to use, simple in structure, high in strength, not liable to break, etc.

7 Claims, 8 Drawing Sheets

(51) Int. Cl.
  *B33Y 10/00* (2015.01)
  *B33Y 80/00* (2015.01)
  *B22F 10/36* (2021.01)
  *B22F 10/366* (2021.01)
  *B22F 10/38* (2021.01)
  *B22F 10/66* (2021.01)

(52) U.S. Cl.
  CPC ............... *B33Y 10/00* (2014.12); *B33Y 80/00* (2014.12); *B22F 10/38* (2021.01); *B22F 10/66* (2021.01); *B22F 2301/205* (2013.01)

(56) References Cited

U.S. PATENT DOCUMENTS

| | | | | |
|---|---|---|---|---|
| 2,910,993 | A * | 11/1959 | Phillips | B60S 3/04 134/123 |
| 3,259,138 | A * | 7/1966 | Heinicke | B60S 3/04 118/316 |
| 3,342,575 | A * | 9/1967 | Dichter | C03B 23/095 118/321 |
| 3,568,638 | A * | 3/1971 | Isaac | B05B 13/0421 118/326 |
| 4,381,726 | A * | 5/1983 | Hojberg | B05C 5/0262 118/313 |
| 4,659,018 | A | 4/1987 | Shulman | |
| 7,779,777 | B2 * | 8/2010 | Shiobara | H01L 21/67253 239/113 |
| 9,771,691 | B2 * | 9/2017 | Howseman, Jr. | B05C 5/02 |
| 10,364,582 | B2 * | 7/2019 | Sasaki | E04G 23/0211 |
| 10,668,252 | B2 * | 6/2020 | White | A61M 25/02 |
| 10,894,354 | B2 * | 1/2021 | Chen | B29C 64/205 |
| 10,967,570 | B2 * | 4/2021 | Li | B29C 64/124 |
| 10,974,442 | B2 * | 4/2021 | Wang | B33Y 30/00 |
| 11,141,787 | B2 * | 10/2021 | Karuppoor | B29C 64/209 |
| 2002/0040679 | A1 * | 4/2002 | Reardon | H01L 21/67086 118/323 |
| 2006/0278161 | A1 * | 12/2006 | Burkholder | B05B 13/02 118/305 |
| 2011/0204102 | A1 * | 8/2011 | Suhara | B05B 1/1636 239/436 |
| 2015/0367620 | A1 * | 12/2015 | DeFillipi | B05C 5/0283 156/244.11 |
| 2018/0272376 | A1 * | 9/2018 | Abe | B05C 9/14 |
| 2020/0324087 | A1 * | 10/2020 | White | A61M 25/0606 |
| 2020/0398302 | A1 * | 12/2020 | Abe | H01L 21/67028 |
| 2021/0404195 | A1 * | 12/2021 | Huth | E04G 21/0463 |

FOREIGN PATENT DOCUMENTS

| | | |
|---|---|---|
| CN | 102019253 A | 4/2011 |
| CN | 202019253 U | 10/2011 |
| CN | 102552744 A | 7/2012 |
| CN | 203061372 U | 7/2013 |
| CN | 203508335 U | 4/2014 |
| CN | 203695315 U | 7/2014 |
| CN | 204672515 U | 9/2015 |
| CN | 106552744 A | 4/2017 |
| CN | 106944626 A | 7/2017 |
| CN | 206689429 U | 12/2017 |
| JP | 10156266 A | 6/1998 |
| JP | 2010202228 A | 9/2010 |
| JP | 2015066514 A | 4/2015 |

* cited by examiner

COMPLEX FLOW TUBE FOR FINE SEALING COATING OF PVC MATERIAL FOR AUTOMOBILE AND MANUFACTURING METHOD THEREFOR

CROSS-REFERENCE TO RELATED APPLICATIONS

This application is the United States national phase of International Application No. PCT/CN2017/113371 filed Nov. 28, 2017, and claims priority to Chinese Patent Application No. 201710245318.X filed Apr. 14, 2017, the disclosures of each of which are hereby incorporated by reference in their entireties.

TECHNICAL FIELD

The present invention relates to an automobile gluing member, and specifically to a complex flow tube for fine sealing coating of a PVC material for an automobile and a manufacturing method therefor.

BACKGROUND ART

With the improvement of living standards, people not only require practicality and reliability for automobiles, but also put forward higher requirements for aesthetics and comfort. In order to make an automobile body have good sealing property, rust protection and durability, doors and windows and the front and rear covers of the body are coated with sealing materials. The common material is a solvent-free PVC coating prepared from polyethylene resin, plasticizer, etc., which can play the role of shock absorption, sound insulation and sealing, thereby improving the comfort and safety of the automobile.

The glue sealing process includes rough sealing and fine sealing. Weld seams that are visible on the exterior of the body are required to have a good appearance effect and thus need to be carefully coated and modified, which becomes the fine sealing. The fine sealing refers to the sealing of an outer surface of the body, door frames and front and rear covers, and is carried out after the bottom of the automobile is sprayed. The fine sealing requires extrusion of adhesive residue after the body is sprayed, and extrusion of PVC glue to hem seams of peripheral plates of an engine cover, gutterway weld seams of a top cover, peripheral hem seams of the rear cover, side seams of four doors, weld seams of four door and window frames, external weld seams of A, B and C upright posts, and gutter channels of the rear cover. The fine sealing plays a role in enhancing the sealing performance of the body, achieving waterproofness, sound insulation and heat insulation, improving the corrosion resistance of the weld seams, and ultimately improving the comfort of the automobile and prolonging the service life. The PVC glue should be extruded to a glue application part accurately without blocking and obstructing mounting holes; the extrusion should be uniform, appropriate, continuous, stable, compact, smooth and non-stacked; and the gluing thickness is 2 to 3 mm.

At present, the automobile gluing process mainly includes manual gluing and robot gluing, where the manual gluing workload is relatively heavy, and the robot gluing is stable in glue discharge, uses precise and steady strength, and achieves a good coating effect. However, due to the complexity of the structure of the automobile, a flow tube for coating needs to be customized, whereby the flow tube cooperates with the structure of the front and rear covers of the automobile for rapid coating to improve the work efficiency.

SUMMARY OF THE INVENTION

The present invention is directed to overcome the above shortcomings and deficiencies of the prior art, and to provide a complex flow tube for fine sealing coating of a PVC material for an automobile and a manufacturing method therefor. The complex flow tube has the advantages of a simple structure, smooth glue flow, high work efficiency and the like, and is especially suitable for coating of complex parts of the automobile.

The present invention is achieved by the following technical solution:

a complex flow tube for fine sealing coating of a PVC material for an automobile, the complex flow tube comprising a base 11 fixed to a mechanical arm, and a pipeline 12 connected to the base 11 for delivering a PVC sealant, wherein the base 11 is detachably butted with an interface of a PVC gluing pump mounted on the mechanical arm; and the PVC gluing pump delivers the PVC sealant through the pipeline 12 to a part to be coated or sealed of the automobile.

The pipeline 12 is divided into a feeding section 121, a transition section 122 and a discharge section 123 sequentially according to the flow direction of the PVC sealant.

The feeding section 121 is a tapered passage, that is, the inner diameter thereof gradually decreases along the flow direction of the PVC sealant.

The discharge section 123 has a "7"-shaped structure as a whole, and is composed of a straight pipe section 123-1 and a bent section 123-2; and the axis of the transition section 122 intersects the axis of the straight pipe section 123-1 at an included angle of 35° to 45°, and the axes of the straight pipe section 123-1 and the bent section 123-2 are perpendicular to each other.

Rounded corner transition is employed at the joints among the feeding section 121, the transition section 122, the straight pipe section 123-1, and the bent section 123-2 to reduce the flow resistance of the PVC sealant.

A rectangular discharge port 123-3 is formed at an end sidewall of the bent section 123-2; and an opening direction of the rectangular discharge port 123-3 is located inside the "7"-shaped structure.

The inner diameter of the transition section 122 and the discharge section 123 is based on a flow design formula $$D = \sqrt{\frac{4G}{\pi v \rho t}}$$

(D is the inner diameter of the pipeline, G is the total discharge weight, v is the discharge speed, and t is the discharge time). According to the design formula and the actual gap size when coating, the transition section 122 and the discharge section 123 are designed to have an inner diameter of 1.50 to 1.60 mm and a wall thickness of 0.10 to 0.25 mm.

The feeding section 121, the transition section 122, the straight pipe section 123-1, and the bent section 123-2 are of a one-time molding structure.

The present invention discloses a preparation method for the complex flow tube for fine sealing coating of a PVC material for an automobile.

The preparation method comprises that metal 3D printing is used for the base 11 and the pipeline 12, respectively; the printed material is processed from titanium alloy, stainless steel or nickel alloy;

if titanium alloy is used for 3D printing, molding parameters are: laser power: 150 W, scanning speed 800 mm/s, stacking thickness 20 microns, laser spot 50 microns, and scanning line spacing 60 microns; the laser scanning strategy is: margins of the outer contour of the pipeline 12 are scanned twice at first, and then the internal solid is filled and scanned to ensure the outer surface quality of the pipeline 12; and the pipeline 12 is vertically inverted during molding, and an included angle between any position of the outer surface of the pipeline 12 and the plane cannot be less than 40° to prevent the addition of a support structure during 3D printing.

Compared with the prior art, the present invention has the following advantages and effects:

The base and the pipeline of the present invention form an integrally molded structure respectively by metal 3D printing, which overcomes the defects that during the conventional sectional welding processing of titanium alloy tubes, welding points are liable to break off, the welding points at all sections are difficult to accurately match and treat, and the titanium alloy tube is relatively thin and thus is prone to weld penetration, etc.

Integrally molded circular arc transitions are employed to the joints of the pipeline of the present invention, which greatly reduces the damping of the sealant, increases the fluidity, and can also reduce the metal 3D printing manufacturing difficulty.

According to the principle of fluid dynamics, in the present application, the feeding section is designed into a tapered passage, that is, the inner diameter thereof gradually decreases along the flow direction of the PVC sealant, the pressure of the sealant increases, and the flow velocity also increases, thereby ensuring sufficient pressure when the sealant is discharged, and improving the stability and smoothness during coating.

The curve structure of the pipeline in the present invention is especially suitable for the coating of complex parts of the automobile structure.

The present invention is combined with the metal 3D printing technology, so that the manufactured complex flow tube has the advantages of being convenient to use, simple in structure, high in strength, not liable to break, etc.

DETAILED DESCRIPTION OF EMBODIMENTS

The following further describes the present invention in detail with reference to specific embodiments.

Embodiment

As shown in FIGS. 1 to 11, the present invention discloses a complex flow tube for fine sealing coating of a PVC material for an automobile, the complex flow tube comprising a base 11 fixed to a mechanical arm, and a pipeline 12 connected to the base 11 for delivering a PVC sealant, wherein the base 11 is detachably butted with an interface of a PVC gluing pump mounted on the mechanical arm; and the PVC gluing pump delivers the PVC sealant through the pipeline 12 to a part to be coated or sealed of the automobile. According to the viscosity of the PVC sealant and the ambient temperature, the inlet pressure of the PVC gluing pump (spraying machine) is adjusted to be in the range of $4.9*10^5$ to $6.9*10^5$ Pa, and the gluing thickness is generally 2 to 3 mm.

The pipeline 12 is divided into a feeding section 121, a transition section 122 and a discharge section 123 sequentially according to the flow direction of the PVC sealant.

The feeding section 121 is a tapered passage, that is, the inner diameter thereof gradually decreases along the flow direction of the PVC sealant.

The discharge section 123 has a "7"-shaped structure as a whole, and is composed of a straight pipe section 123-1 and a bent section 123-2; and the axis of the transition section 122 intersects the axis of the straight pipe section 123-1 at an included angle of 35° to 45°, and the axes of the straight pipe section 123-1 and the bent section 123-2 are perpendicular to each other.

Rounded corner transition is employed at the joints among the feeding section 121, the transition section 122, the straight pipe section 123-1, and the bent section 123-2 to reduce the flow resistance of the PVC sealant.

A rectangular discharge port 123-3 is formed at an end sidewall of the bent section 123-2; and an opening direction of the rectangular discharge port 123-3 is located inside the "7"-shaped structure.

The inner diameter of the transition section 122 and the discharge section 123 is based on a flow design formula $$D = \sqrt{\frac{4G}{\pi v \rho t}}$$

(D is the inner diameter of the pipeline, G is the total discharge weight, v is the discharge speed, and t is the discharge time). According to the design formula and the actual gap size when coating, the transition section 122 and the discharge section 123 are designed to have an inner diameter of 1.50 to 1.60 mm and a wall thickness of 0.10 to 0.25 mm.

The feeding section 121, the transition section 122, the straight pipe section 123-1, and the bent section 123-2 are of a one-time molding structure.

Figures 8, 9:
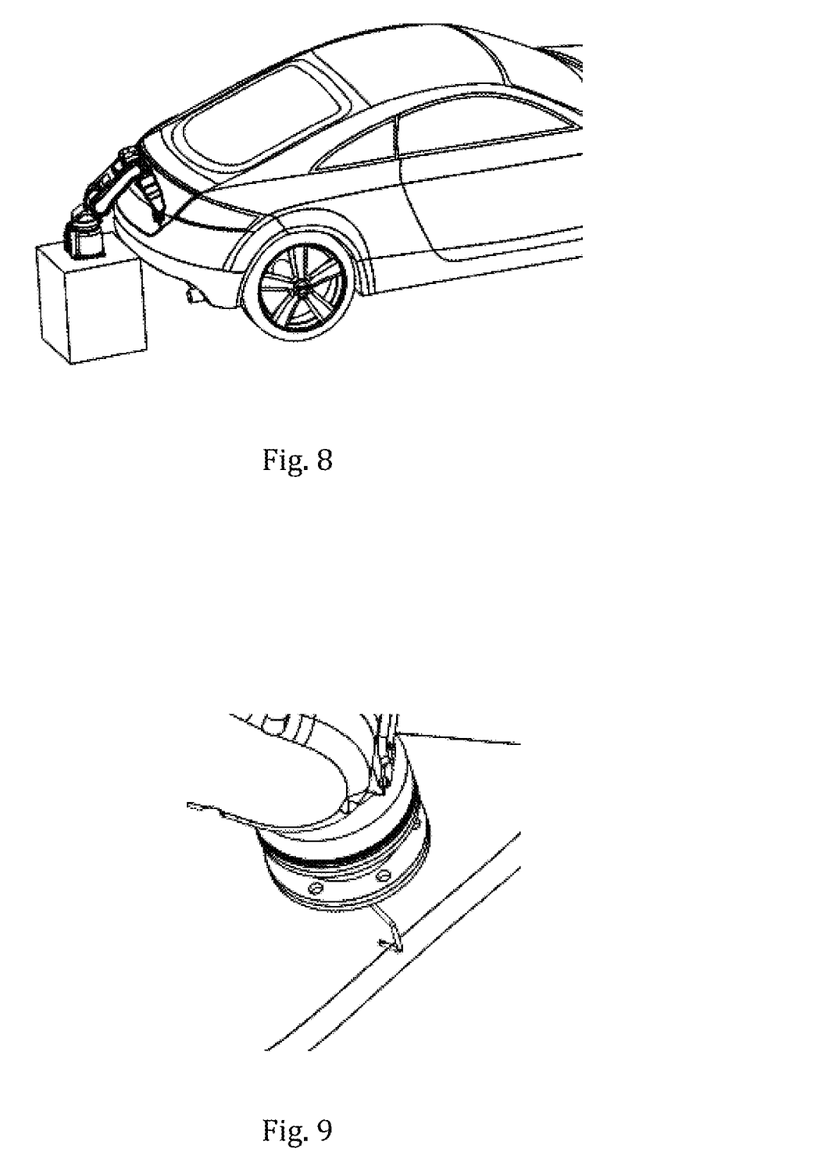
FIG. 8 is a schematic diagram I of the present invention when in use.
FIG. 9 is a schematic diagram II of the present invention when in use.
Figure 10:
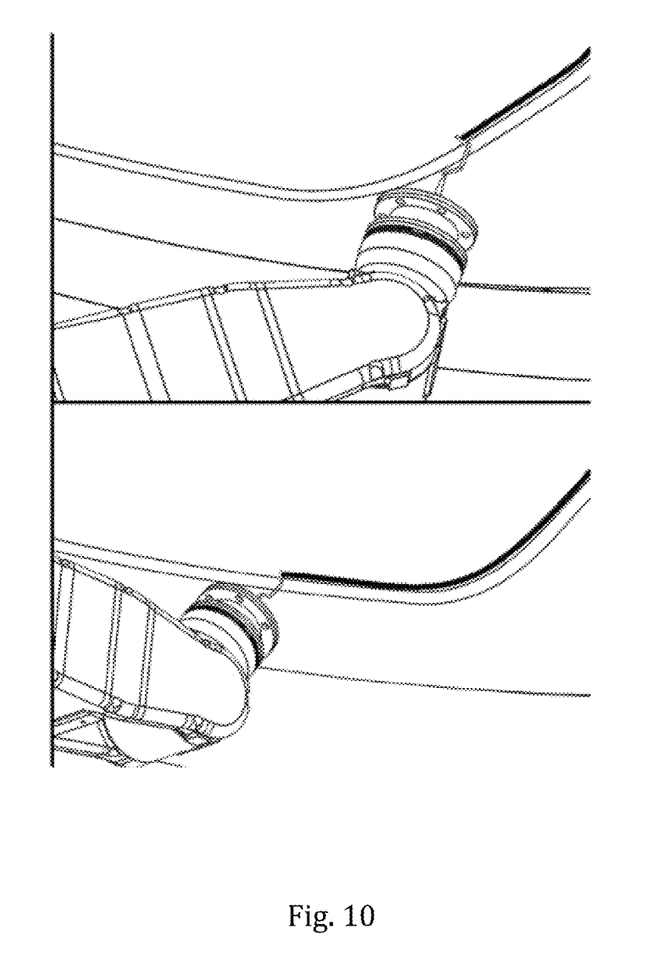
FIG. 10 is a schematic diagram III of the present invention when in use.
Figure 11:
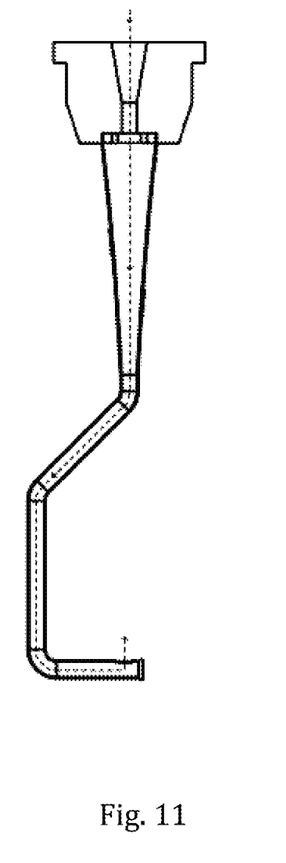
FIG. 11 is a schematic diagram showing the flow direction of a PVC sealant when discharged according to the present invention.

If a rear cover of the automobile is coated, the bent section 123-2 is put into a gap between the rear cover and the body in a direction parallel to the edge of the rear cover of the automobile, and then rotated by a certain angle to align the rectangular discharge port 123-3 with the surface to be glued, as shown in FIG. 8 and FIG. 9.

The present invention discloses a preparation method for the complex flow tube for fine sealing coating of a PVC material for an automobile.

Figure 1:
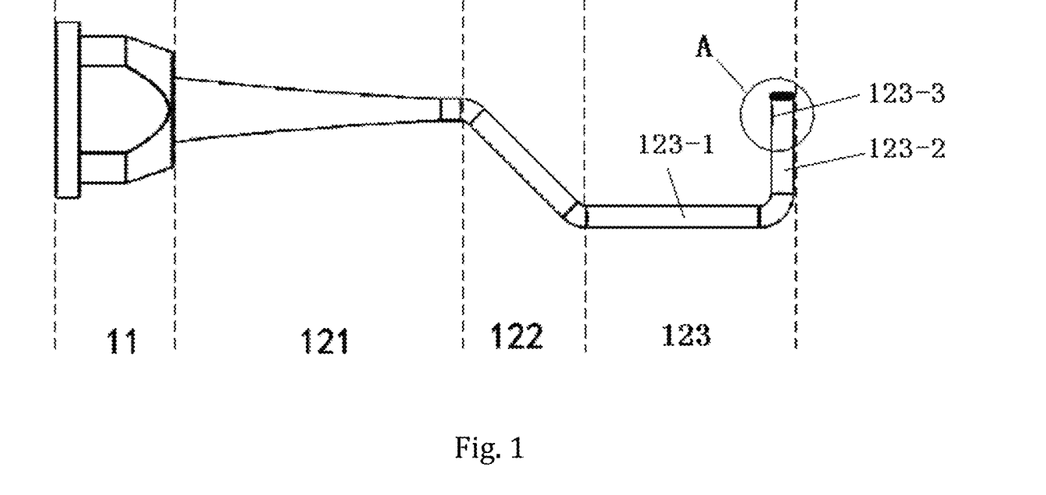
FIG. 1 is a schematic structural diagram of a complex flow tube for fine sealing coating of a PVC material for an automobile according to the present invention.
Figure 2:
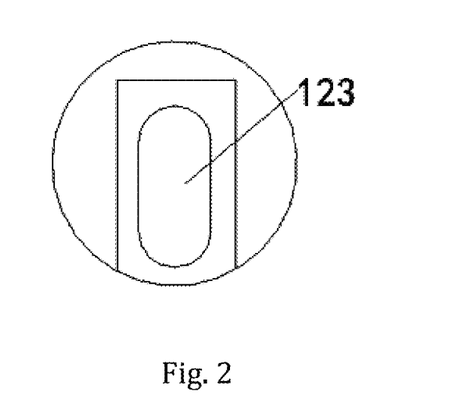
FIG. 2 is an enlarged schematic diagram of a section A in FIG. 1.
Figure 3:
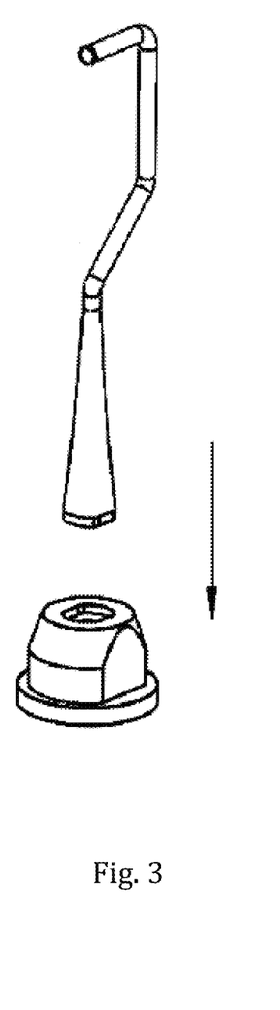
FIG. 3 is a schematic structural diagram according to the present invention before assembly.
Figure 4:
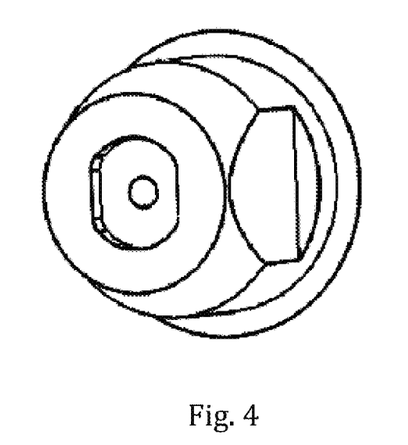
FIG. 4 is a schematic structural diagram of a base according to the present invention.
Figure 5:
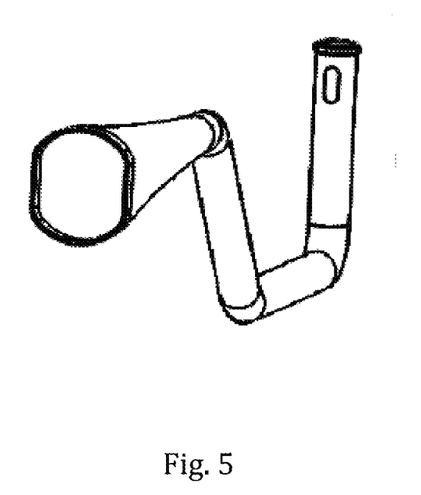
FIG. 5 is a schematic structural diagram of a pipeline according to the present invention.
Figure 6:
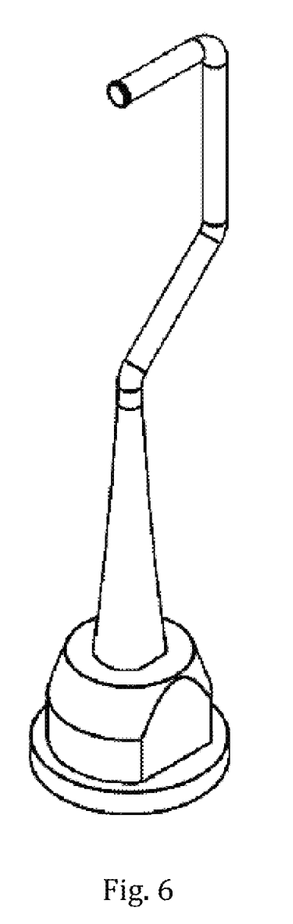
FIG. 6 is a schematic structural diagram of FIG. 3 after assembly.
Figure 7:
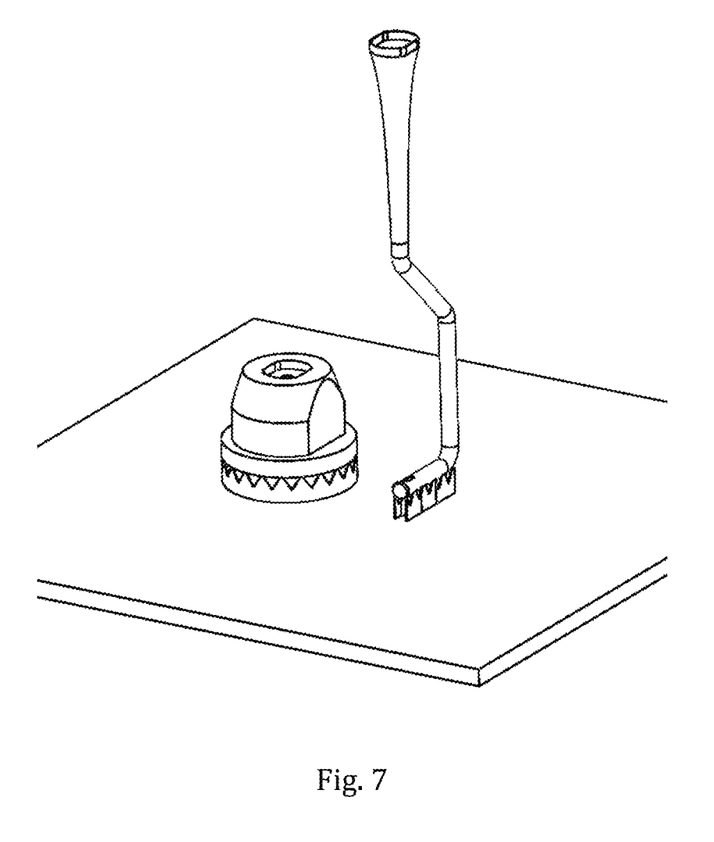
FIG. 7 is a schematic diagram of arrangement of the present invention when molded.

The preparation method comprises that metal 3D printing is used for the base 11 and the pipeline 12, respectively; the printed material is processed from titanium alloy, stainless steel or nickel alloy;

if titanium alloy is used for 3D printing, molding parameters are: laser power: 150 W, scanning speed 800 mm/s, stacking thickness 20 microns, laser spot 50 microns, and scanning line spacing 60 microns; the laser scanning strategy is: margins of the outer contour of the pipeline 12 are scanned twice at first, and then the internal solid is filled and scanned to ensure the outer surface quality of the pipeline 12; and since the pipeline 12 has a complex structure, a small inner diameter and a thin wall, it is necessary to pay attention to the laying angle of the pipeline when molding, that is, the pipeline 12 is vertically inverted during molding, and an included angle between any position of the outer surface of the pipeline 12 and the plane cannot be less than 40° to prevent the addition of a support structure during 3D printing. As shown in FIG. 7.

After the printing of the base 11 and the pipeline 12 is completed, the surface grinding and polishing are required, including the cleaning of the rectangular discharge port to ensure the shape and size accuracy of the discharge port, thereby improving the gluing quality.

As described above, the present invention can be preferably implemented.

The implementations of the present invention are not limited to the above embodiments. Any other changes, modifications, substitutions, combinations or simplifications made without departing from the spirit essence and principle of the present invention shall be equivalent replacements, and shall be included within the scope of protection of the present invention.

The invention claimed is:

1. A complex flow tube for fine sealing coating of a PVC material for an automobile, the complex flow tube comprising a base fixed to a mechanical arm, and a pipeline connected to the base for delivering a PVC sealant, wherein the base and the pipeline are formed by metal 3D printing and the base is detachably butted with an interface of a PVC gluing pump mounted on the mechanical arm;

the PVC gluing pump delivers the PVC sealant through the pipeline to a part to be coated or sealed of the automobile;

wherein the pipeline is divided into a feeding section, a transition section and a discharge section sequentially according to a flow direction of the PVC sealant;

the feeding section is a tapered passage, an inner diameter thereof gradually decreasing along the flow direction of the PVC sealant;

the discharge section has a "7"-shaped structure as a whole, and is composed of a straight pipe section and a bent section; and an axis of the transition section intersects an axis of the straight pipe section at an included angle of 35° to 45°, and the axis of the straight pipe section and an axis of the bent section are perpendicular to each other.

2. The complex flow tube for fine sealing coating of a PVC material for an automobile according to claim 1, wherein rounded corner transition is employed at joints among the feeding section, the transition section, the straight pipe section, and the bent section to reduce a flow resistance of the PVC sealant.

3. The complex flow tube for fine sealing coating of a PVC material for an automobile according to claim 1, wherein a rectangular discharge port is formed at an end sidewall of the bent section; and an opening direction of the rectangular discharge port is located inside the "7"-shaped structure.

4. The complex flow tube for fine sealing coating of a PVC material for an automobile according to claim 2, wherein an inner diameter of the transition section and the discharge section is based on a flow design formula $$D = \sqrt{\frac{4G}{\pi v \rho t}},$$

where D is an inner diameter of the pipeline, G is a total discharge weight, v is a discharge speed, and t is a discharge time; and according to the formula and an actual gap size when coating, the transition section and the discharge section are designed to have an inner diameter of 1.50 to 1.60 mm and a wall thickness of 0.10 to 0.25 mm, respectively.

5. The complex flow tube for fine sealing coating of a PVC material for an automobile according to claim 2, wherein the feeding section, the transition section, the straight pipe section, and the bent section are of a one-time molding structure.

6. A preparation method for the complex flow tube for fine sealing coating of a PVC material for an automobile according to claim 5, the preparation method comprising that metal 3D printing is used for the base and the pipeline, respectively;

printed material is processed from titanium alloy, stainless steel or nickel alloy; and the pipeline is vertically inverted during molding, and an included angle between any position of an outer surface of the pipeline and a plane cannot be less than 40° to prevent addition of a support structure during the 3D printing.

7. The preparation method according to claim 6, wherein the titanium alloy is used for the 3D printing and molding parameters are: laser power: 150 W, scanning speed: 800 mm/s, stacking thickness: 20 microns, laser spot: 50 microns, and scanning line spacing: 60 microns; and a laser scanning strategy is: margins of an outer contour of the pipeline are scanned twice at first, and then an internal solid is filled and scanned to ensure an outer surface quality of the pipeline.

* * * * *